(12) United States Patent
Kim

(10) Patent No.: US 10,805,868 B2
(45) Date of Patent: *Oct. 13, 2020

(54) METHOD FOR TRANSMITTING AND RECEIVING DOWNLINK CHANNEL FOR MTC TERMINAL, AND APPARATUS THEREFOR

(71) Applicant: INTELLECTUAL DISCOVERY CO., LTD., Seoul (KR)

(72) Inventor: Sun Woo Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,951

(22) Filed: Jun. 21, 2018

(65) Prior Publication Data

US 2018/0302849 A1 Oct. 18, 2018

Related U.S. Application Data

(63) Continuation of application No. 15/112,145, filed as application No. PCT/KR2015/000384 on Jan. 14, 2015, now Pat. No. 10,028,207.

(30) Foreign Application Priority Data

Jan. 16, 2014 (KR) .......................... 10-2014-0005618
Jan. 21, 2014 (KR) .......................... 10-2014-0007272
(Continued)

(51) Int. Cl.
*H04W 4/00* (2018.01)
*H04W 48/16* (2009.01)
(Continued)

(52) U.S. Cl.
CPC ............... *H04W 48/16* (2013.01); *H04L 1/08* (2013.01); *H04L 5/0053* (2013.01);
(Continued)

(58) Field of Classification Search
CPC ........... H04B 7/26; H04L 1/08; H04L 5/0023; H04L 5/0035; H04L 5/0048; H04W 48/08;
(Continued)

(56) References Cited

U.S. PATENT DOCUMENTS 9,485,763 B2  11/2016  You
9,596,660 B2   3/2017  Park
(Continued)

FOREIGN PATENT DOCUMENTS

JP    2012-514361 A    6/2012
KR    10-2009-0120420 A    11/2009
(Continued)

OTHER PUBLICATIONS

Samsung, Coverage enhancements for low-cost MTC UEs, 3GPP TSG RAN WG1 Meeting #73, 2 pages, May 2013.*
(Continued)

*Primary Examiner* — Frank Duong
(74) *Attorney, Agent, or Firm* — Sughrue Mion, PLLC

(57) ABSTRACT

The present invention relates to a method and an apparatus for a base station transmitting a downlink signal for a machine-type communication (MTC) terminal. More specifically, the present invention relates to a method for transmitting and receiving PBCH, PRACH, PDSCH, PDCCH or EPDCCH for a low cost and enhanced coverage MTC terminal, and an apparatus therefor. Particularly, provided are an apparatus and a method for a base station transmitting a control channel, the method comprising the steps of repeatedly transmitting a control channel comprising control information, and repeatedly transmitting down-
(Continued)

link data channel (PDSCH) on the basis of information for a subframe ending the control channel being repeatedly transmitted.

18 Claims, 9 Drawing Sheets

(30) Foreign Application Priority Data

| | | | |
|---|---|---|---|
| Mar. 24, 2014 | (KR) | ................ | 10-2014-0034126 |
| Dec. 10, 2014 | (KR) | ................ | 10-2014-0177482 |
| Dec. 10, 2014 | (KR) | ................ | 10-2014-0177488 |

(51) Int. Cl.
*H04L 1/08* (2006.01)
*H04L 5/00* (2006.01)
*H04W 56/00* (2009.01)
*H04W 74/08* (2009.01)
*H04W 88/08* (2009.01)
*H04W 88/02* (2009.01)
*H04W 48/12* (2009.01)
*H04L 1/00* (2006.01)
*H04W 88/10* (2009.01)

(52) U.S. Cl.
CPC ..... *H04W 56/001* (2013.01); *H04W 74/0833* (2013.01); *H04L 1/0045* (2013.01); *H04L 5/0023* (2013.01); *H04L 5/0035* (2013.01); *H04L 5/0094* (2013.01); *H04W 48/12* (2013.01); *H04W 88/02* (2013.01); *H04W 88/08* (2013.01); *H04W 88/10* (2013.01); *Y02D 30/70* (2020.08)

(58) Field of Classification Search
CPC . H04W 48/16; H04W 48/12; H04W 52/0206; H04W 56/001; H04W 72/04; H04W 72/042; H04W 74/08; H04W 74/0833; H04W 88/02; H04W 88/08; H04W 88/10; H04W 88/16
See application file for complete search history.

(56) References Cited

U.S. PATENT DOCUMENTS

| | | | | |
|---|---|---|---|---|
| 9,667,386 | B2* | 5/2017 | Li | .............. H04L 1/0072 |
| 9,674,710 | B2* | 6/2017 | Chen | ............ H04W 16/18 |
| 9,854,609 | B2* | 12/2017 | Yang | ............ H04W 74/08 |
| 9,860,890 | B2* | 1/2018 | You | ............ H04L 5/0007 |
| 9,894,644 | B2* | 2/2018 | Kang | ............ H04L 5/0044 |
| 10,009,882 | B2* | 6/2018 | You | ............ H04L 5/0053 |
| 2013/0315218 | A1 | 11/2013 | Cheong et al. | |
| 2016/0165640 | A1 | 6/2016 | Yang | |
| 2016/0249331 | A1 | 8/2016 | Park | |
| 2016/0278052 | A1 | 9/2016 | Kim | |
| 2016/0302087 | A1 | 10/2016 | Luo | |

FOREIGN PATENT DOCUMENTS

| | | |
|---|---|---|
| KR | 10-2011-0093648 A | 8/2011 |
| KR | 10-2013-0113521 A | 10/2013 |

OTHER PUBLICATIONS

International Search Report for International Patent Application No. PCT/KR2015/000384 filed Jan. 14, 2015.

Alcatel-Lucent et al., "Considerations for (E)PDCCH in coverage enhancement", 3GPP TSG-RAN WG1 Meeting #75, Nov. 11-15, 2013, pp. 1-4, R1-135156, San Francisco, USA.

Fujitsu, "Discussion on the (E)PDCCH repetition in time domain for MTC UEs", 3GPP TSG RAN WG1 Meeting #74bis, Oct. 7-11, 2013, pp. 1-3, R1-134343, Guangzhou, China.

Mediatek Inc., "Discussion on timing relationship for (E)PDCCH and PDSCH", 3GPP TSG-RAN WG1 #75, Nov. 11-15, 2013, pp. 1-4, R1-135427, San Francisco, USA.

ZTE "Discussion on Traffic Channel Coverage Improvement", 3GPP TSG RAN WG1 Meeting #74bis, Oct. 7-11, 2013, pp. 1-6, R1-134304, Guangzhou, China.

* cited by examiner

METHOD FOR TRANSMITTING AND RECEIVING DOWNLINK CHANNEL FOR MTC TERMINAL, AND APPARATUS THEREFOR

CROSS-REFERENCE TO RELATED APPLICATIONS

The present specification is a continuation of U.S. patent application Ser. No. 15/112,145 filed on Jul. 15, 2016, which is a U.S. National Stage of International Patent Application No. PCT/KR2015/000384 filed on Jan. 14, 2015, which claims priority to and the benefit of Korean Patent Application No. 10-2014-0005618 filed on Jan. 16, 2014, Korean Patent Application No. 10-2014-0007272 filed on Jan. 21, 2014, Korean Patent Application No. 10-2014-0034126 filed on Mar. 24, 2014, Korean Patent Application No. 10-2014-0177482 filed on Dec. 10, 2014, Korean Patent Application No. 10-2014-0177488 filed on Dec. 10, 2014, the entire contents of which are incorporated herein by reference.

TECHNICAL FIELD

The present invention relates to a method for transmitting and receiving a downlink signal by means of a base station for an MTC (Machine Type Communication) terminal, and an apparatus therefor. More particularly, the present invention relates to a method of transmitting and receiving, a PBCH, a PRACH, a PDSCH, a PDCCH, or an EPDCCH for a Low Cost & Enhanced Coverage MTC terminal, and an apparatus therefor.

BACKGROUND ART

MTC, machine type communication, means communication between a device and an object without a person or with minimum people involved. The 'machine' may mean an object that does not require direct operation or intervention and 'MTC' may mean a type of data communication including one or more machines. For example, the 'machine' may be a smart meter or a vending machine equipped with a mobile communication module, and recently, a mobile terminal having an MTC function is considered as a type of the 'machine' with the advent of a smartphone that performs communication by automatically connecting with a network without operation or intervention of a user in accordance with the location or condition of the user.

An MTC terminal may be installed at places under a poor radio environment such as a basement, as compared with common terminals. Accordingly, there is a need for improving the coverage of MTC terminals over 20 dB, as compared with the coverage of common terminals. That is, it is required to improve the coverage and the communication power of MTC terminals, which may be installed at places under a poor radio environment, in order to communicate with a base station.

Therefore, MTC terminals are required to repeatedly transmit control information and data information of a physical channel in order to operate in a coverage improved in comparison to existing common terminals. Further, it is required to determine efficient rules between a terminal and a base station when repeatedly transmitting information through each physical channel.

DISCLOSURE

Technical Problem

In order to solve the problems, the present invention defines subframe rules for repeated transmission through a physical channel for an MTC terminal.

Further, the present invention provides a method and an apparatus for efficiently transmitting and receiving a downlink signal by determining the relationship between transmission and reception through a PBCH, a PRACH, a PDSCH, a PDCCH, and an EPDCCH as a physical channel for an MTC terminal.

Technical Solution

According to an aspect, the present invention provides a method of transmitting a control channel by means of a base station, the method including a step of repeatedly transmitting a control channel including control information and a step of repeatedly transmitting a downlink data channel (PDSCH) on the basis of information about a subframe where repetition transmission of the control channel is ended.

According to another aspect, the present invention provides a method of receiving a control channel by means of a terminal, the method including a step of repeatedly receiving a control channel including control information and a step of repeatedly receiving a downlink data channel (PDSCH) on the basis of information about a subframe where repetition transmission of the control channel is ended.

According to another aspect, the present invention provides a base station that transmits a control channel, the base station including a control unit that determines a specific subframe where repetition transmission of a control channel is started and a transmitting unit that repeatedly transmits a control channel including control information from the specific subframe and repeatedly transmits a downlink data channel (PDSCH) on the basis of information about the subframe where the repeatedly transmitted control channel is ended, in which when the subframe is composed of a subset of at least two subframes, the control unit determines the specific subframe as one of the subframes included in the subset.

According to another aspect, the present invention provides a terminal that receives a control channel, the terminal including: a receiving unit that repeatedly receives a control channel including control information; and a control unit that acquires the control information by decoding the control channel, in which the receiving unit repeatedly receives a downlink data channel on the basis of information about a subframe where the repeatedly transmitted control channel is ended.

Effect

The present invention described above provides an effect for an MTC terminal to efficiently communicate with a base station in a wider coverage by defining subframe rules for repeatedly transmitting physical channels for the MTC terminal.

Further, the present invention provides a method and an apparatus for efficiently transmitting and receiving a downlink signal by determining the relationship between transmission and reception through a PBCH, a PRACH, a PDSCH, a PDCCH, and an EPDCCH as a physical channel for an MTC terminal.

BEST MODE

Figure 1:
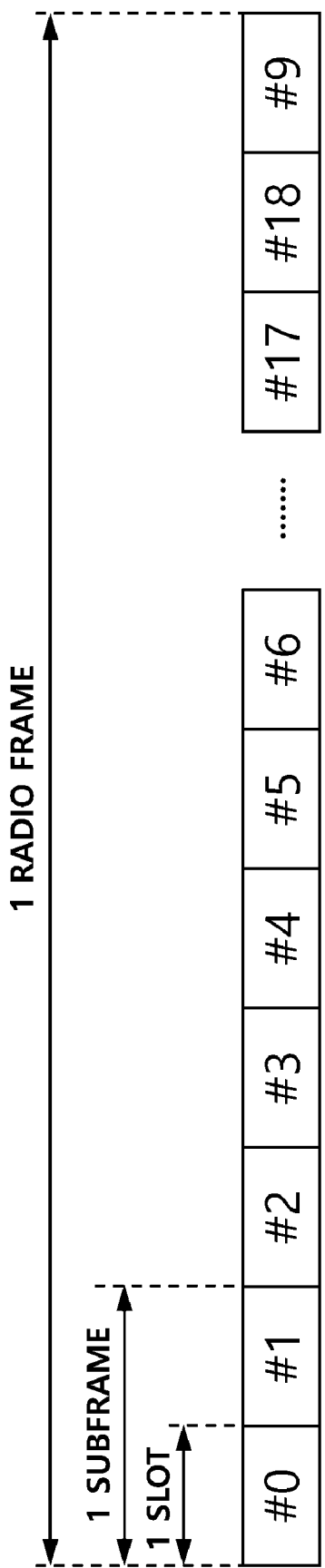
FIG. 1 is a diagram illustrating an example of a wireless frame structure of an LTE FDD mode.

Hereinafter, embodiments of the present invention will be described with reference to exemplary diagrams. In the specification, in adding reference numerals to components throughout the drawings, it should be noted that like reference numerals designate like components even though components are illustrated in different drawings. Further, in describing the present invention, well-known functions or constructions will not be described in detail since they may unnecessarily obscure the understanding of the present invention.

The MTC terminal stated herein may mean a terminal supporting a low cost (or low complexity) or a terminal supporting coverage enhancement. The MTC terminal stated herein may mean a terminal supporting a low cost (or low complexity) and coverage enhancement. Alternatively, the MTC terminal stated herein may mean a terminal defined in a specific category to support a low cost (or low complexity) and/or coverage enhancement.

In the present invention, a wireless communication system is widely disposed to provide various communication services such as voice and packet data. The wireless communication system includes user equipment (UE) and a base station (BS or eNB). The user equipment stated herein, which is comprehensive conception, should be construed as conception including all of not only UE (User Equipment) for WCDMA, LTE, HSPA, and the like, but a MS (Mobile Station), a UT (User equipment), an SS (Subscriber Station), a wireless device, and the like, for GSM.

A base station or a cell generally means a station where communication with user equipment is performed, and may be referred to as other terms such as node-B, eNB (evolved Node-B), a sector, a site, a BTS (Base Transceiver System), an access point, a relay node, an RRH (Remote Radio Head), an RU (Radio Unit), and a small cell.

That is, a base station or a cell stated herein should be construed as a comprehensive meaning that shows some areas or functions covering a BSC (Base Station Controller) for CDMA, a NodeB of WCDMA, and an eNB or sector (site) for LTE and is a meaning that includes all of various coverage regions such as communication ranges of a mega cell, a macro cell, a micro cell, a pico cell, femto cell, and relay node, PRH, CU, and a small cell.

The various cells described above have base stations that control the cells, so the base stations can be construed as two meanings. i) The base stations may be a device itself that provides a mega cell, a macro cell, a micro cell, a pico cell, a femto cell, and a small cell or ii) may indicate a wireless region itself, in relation to the wireless region. Devices that provide a predetermined wireless region in the case i) are controlled by the same object or, all of devices that interact with each other to configure the wireless region in cooperation with each other are indicated by base stations. An eNB, an RRH, an antenna, a RU, an LPN, a point, a transmission/reception point, a transmission point, and a reception point are examples of a base station, depending on the way of configuring a wireless region. A wireless region itself where signals are transmitted or received in respect of user equipment or an adjacent base station may be indicated as a base station in the case ii).

Accordingly, a mega cell, a macro cell, a micro cell, a pico cell, a femto cell, a small cell, an RRH, an antenna, an RU, an LPN (Low Power Node), a point, an eNB, a transmission/reception point, a transmission point, and a reception point are, in combination, referred to as a base station.

User equipment and a base station are used herein as comprehensive meanings as two kinds of transmission/reception subjects that are used for implementing the technology or the technological spirit and are not limited to specific terms or words. User equipment and a base station are used herein as comprehensive meanings as two kinds of transmission/reception subjects (uplink or downlink) that are used for implementing the technology or the technological spirit and are not limited to specific terms or words. Herein, the uplink (UL) means a way of transmitting/receiving data to a base station by user equipment and the downlink (DL) means a way of transmitting/receiving data to user equipment by a base station.

There is no limit in multiple access scheme that is applied to wireless communication systems. Further, various multiple access schemes such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA may be used. An embodiment of the present invention may be applied to source assignment in a non-synchronized wireless communication field that has been evolved to LTE and LTE-Advanced through GSM, WCDMA, and HSPA and a synchronized wireless communication field is being evolved to CDMA, CDMA-2000, and UMB. The present invention should not be construed as being limited to a specific wireless communication field, but should be construed as including all technical fields to which the spirit of the present invention can be applied.

A TDD (Time Division Duplex) technique that uses different times for uplink transmission and downlink transmission may be used, or an FDD (Frequency Division Duplex) technique that transmits data using different frequencies may be used.

Further, in a system such as an LTE and LTE-advanced system, an uplink and a downlink are configured and standards are configured on the basis of one carrier or a pair of carriers. The uplink and the downlink transmit control information through a control channel such as a PDCCH (Physical Downlink Control Channel), a PCFICH (Physical Control Format Indicator Channel), a PHICH (Physical Hybrid ARQ Indicator Channel), a PUCCH (Physical Uplink Control Channel), and an EPDCCH (Enhanced Physical Downlink Control Channel), and are configured by a data channel such as a PDSCH (physical Downlink Shared Channel) and a PUSCH (Physical Uplink Shared Channel) and transmit data.

Meanwhile, it is possible to transmit control information even using an EPDCCH (enhanced PDCCH or extended PDCCH).

A cell stated herein may mean a coverage of a signal transmitted from a transmission/reception point, a component carrier having a coverage of a signal transmitted from a transmission/reception point (or transmission point), or the transmission/reception point itself.

A wireless communication system to which embodiments are applied may be a coordinated multi-point transmission/reception system (CoMP system), a coordinated multi-antenna transmission system, or a coordinated multi-cell communication system in which two or more transmission/reception points transmit a signal in cooperation with each other. The CoMP system may include at least two multi-transmission/reception points and terminals.

The multi-transmission/reception points may be a base station or a macro cell (hereafter, referred to as 'eNB'), or at least one RRH that is connected with the eNB through an optical cable or an optical fiber to controlled with a wire and has high transmission power or low transmission power in a macro cell region.

Hereinafter, the downlink means communication or a communication path from multi-transmission/reception points to a terminal and the uplink means communication or a communication path from a terminal to multi-transmission/reception points. In the downlink, a transmitter may be a portion of a multi-transmission/reception points and a receiver may be a portion of terminals. In the uplink, a transmitter may be a portion of terminals and a receiver may be a portion of a multi-transmission/reception points.

Hereinafter, a situation in which a signal is transmitted/received through a channel such as a PUCCH, a PUSCH, a PDCCH, an EPDCCH, and a PDSCH may be expressed like "a PUCCH, a PUSCH, a PDCCH, an EPDCCH, and a PDSCH are transmitted and received".

Further, hereinafter, the fact that a PDCCH is transmitted or received, or a signal is transmitted or received through a PDCCH may be used as a meaning including the fact that an EPDCCH is transmitted or received, or a signal is transmitted or received through an EPDCCH.

That is, in the following description, a physical downlink control channel may mean a PDCCH or an EPDCCH and is also used as a meaning that includes both of PDCCH and EPDCCH.

Further, for the convenience of description, an EPDCCH that is an embodiment of the present invention may be applied to the description with a PDCCH and an EPDCCH that is an embodiment of the present invention may be applied to the description with EPDCCH.

Meanwhile, high layer signaling to be described below includes RRC signaling that transmits RRC information including an RRC parameter.

The eNB performs downlink transmission on terminals. The eNB can transmit a physical downlink shared channel (PDSCH) that is a main physical channel for unicast transmission, and a physical downlink control channel (PDCCH) for transmitting scheduling admission information for transmission in downlink control information and an uplink data channel (for example, a physical uplink shared channel (PUSCH)) for scheduling, and the like required for receiving the PDSCH. Hereinafter, signal transmission and reception through a channel is expressed as transmission and reception of the corresponding channel.

FIG. 1 is a diagram illustrating an example of a wireless frame structure of an LTE FDD mode.

Referring to FIG. 1, a time-frequency resource in an LTE FDD mode is divided into 10 ms wireless frames. The 10 ms wireless frames are each divided into ten 1 ms subframes and the subframes are each divided into two 0.5 ms slots.

One slot is composed of seven or six symbols on the time axis, in which a normal cyclic prefix includes seven symbols and an extended cyclic prefix includes six symbols.

Transmission of OFDM symbols are made by one by one, but is affected by previous symbols while an OFDM symbol is transmitted through a multi-path channel. In order to prevent interference between OFDM symbols, a guard interval longer than the maximum delay spread of channels is inserted at the front of each symbol. An OFDM symbol period is the sum of an effective symbol interval where data is actually transmitted and the guard interval, and the guard interval is removed and then taking data during the effective symbol interval, thereby performing modulation at a reception terminal. The signal in the last interval is copied and inserted in the effective symbol interval to prevent destruction of straightness that may be caused by delay of subcarrier in the guard interval, and which is called a cyclic prefix (CP).

In LTE, the length of the normal CP is about 5 μs and the length of the extended CP is about 17 μs. The extended CP has a large cell radius such as a suburban and can be used for long delay spread. The extended CP is increased in length of the CP, as compared with the normal CP, and accordingly, the number of symbols decreases from 7 to 6.

One slot is composed of a plurality of RBs (resource blocks) in a frequency region and one slot may include RBs minimum 6 to maximum 110.

PBCH (Physical Broadcasting Channel, Hereafter PBCH)

In general, basic system information in a mobile communication system is transmitted using a broadcasting channel. In LTE, as broadcasting system information, there are an MIB (Master Information Block) and an SIB (System Information Block), in which the MIB is transmitted through a PBCH and the SIB is transmitted through a downlink shared channel.

The PBCH is mapped to 72 subcarriers at the center in a frequency band of an OFDM signal.

Accordingly, a terminal can detect a PBCH by checking only the 72 subcarriers at the center even if it does not know any information about a system bandwidth at the early stage.

Figure 2:
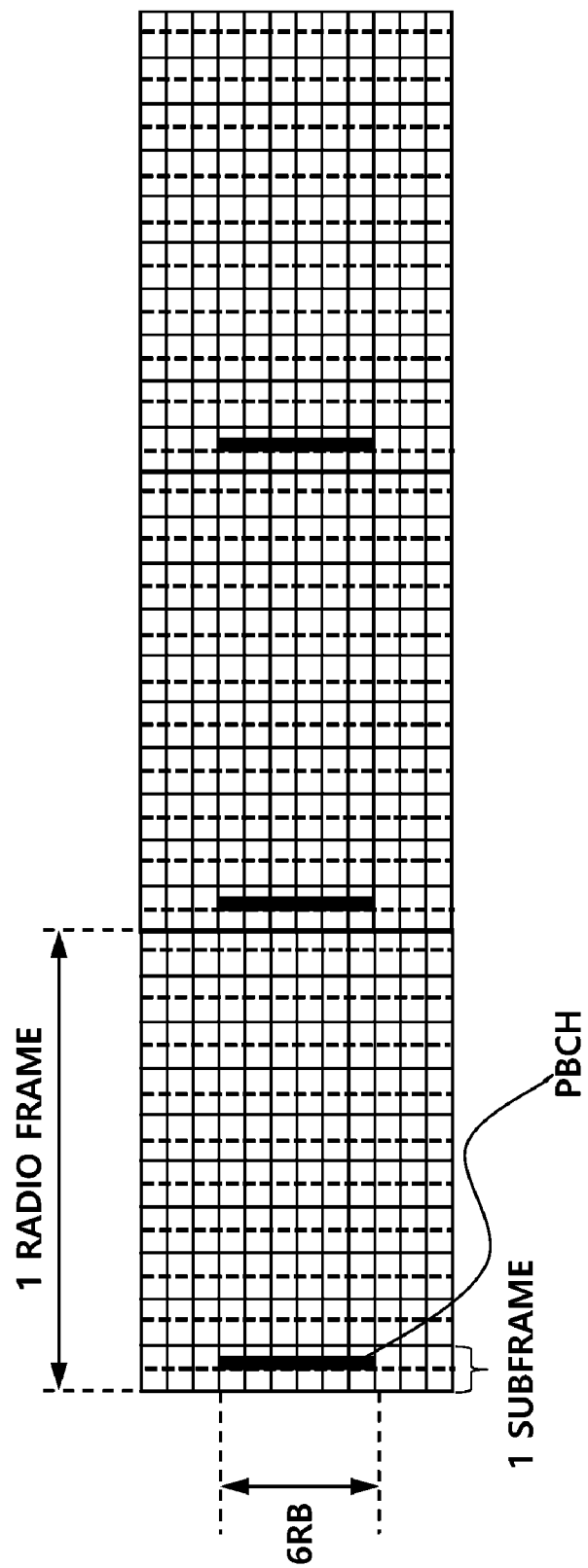
FIG. 2 is a diagram illustrating the structure of a PBCH.

FIG. 2 is a diagram illustrating the structure of a PBCH.

Referring to FIG. 2, an existing PBCH is disposed only at the second slot of the first subframe. That is, it is assigned only to the slot number 1. The PBCH is composed of four OFDM symbols and is assigned with about six resource blocks above and under a DC (0 frequency) always on the PBCH frequency axis.

The MIB has a size of 14 bits and is repeated at each 40 ms, so the data transmission speed of the PBCH is 350 bps. A 16 bit CRC is added to the MIB and the MIB is divided into four subsets after coding, in which the subsets are transmitted using four different wireless frames at the transmission period of 40 ms. When the SIR (Signal to Interference Ratio) characteristic of a wireless channel is good, a terminal can detect the MIB even if only some of the four wireless frames are modulated, so it is not required to receive the other wireless frames. When the SIR characteristic is poor, wireless frames are additionally received and then are soft-combined, thereby detecting the MIB.

A base station of the present invention can repeatedly transmit the PBCH for an MTC terminal. For example, it is possible to repeatedly transmit the PBCH in any one of the following methods in a PBCH cycle that is a specific cycle (for example, 40 ms) (the repetition burst within the 40 ms PBCH cycle).

For example, the base station can perform repeated transmission at the subframe #0 (SF #0) (repetition in SF #0).

Further, the base station may perform repeated transmission at each subframe #0 (repetition in SF #0) and/or may perform repeated transmission at each subframe #5 (repetition in SF #5).

Alternatively, the base station may perform repeated transmission at the subframe #0 (SF #0) (repetition in SF #0) at all frames and/or may perform repeated transmission at another subframe (repetition in 1 other subframe).

Alternatively, the base station may perform repeated transmission at the subframe #0 (SF #0) (repetition in SF #0) at all frames and/or may perform repeated transmission at other three subframes (repetition in 3 other subframe).

Meanwhile, specific REs (Resource element) may be excepted in the repeated transmission of the PBCH.

Meanwhile, user data and MIB repeated transmission may not be transmitted at the same PRBs. In other words, the PDSCH and the PBCH may be transmitted without being multiplied at the same PRBs. User data is not transmitted to the PRBs where the PBCH is repeatedly transmitted.

On the other hand, configuration of transmission across 40 ms cycles may be always repeatedly transmitted at all cycles, dynamically on/off to be repeatedly transmitted at every 40× ms (x is a natural number larger than 1) (dynamic on/off repetitions on a per 40× ms cycle basis), or repeatedly transmitted on the basis of a pattern by a predetermined numbers of cycles.

Figure 3:
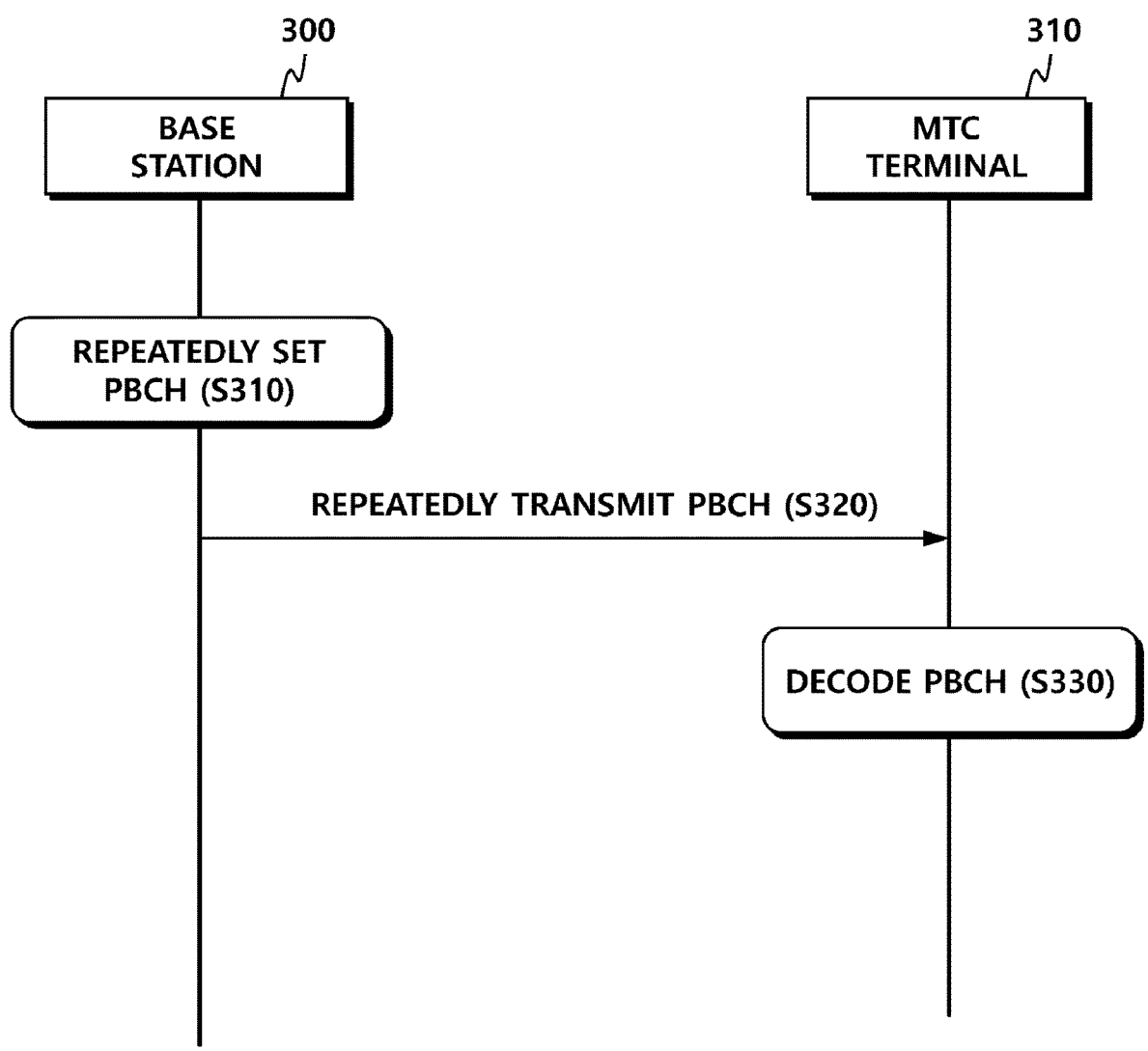
FIG. 3 is a diagram illustrating repeated transmission through a PBCH according to an embodiment of the present invention.

FIG. 3 is a diagram illustrating repeated transmission through a PBCH according to an embodiment of the present invention.

Referring to FIG. 3, a base station 300 can perform setting for repeatedly transmit a PBCH on the basis of at least one method of the methods described above (S310). The base station can set repeated transmission by repeatedly assign a PBCH transmission resource for transmitting the PBCH, as described above, to a specific subframe.

The method of repeatedly assign a transmission resource to each subframe, as described above, may assign it to a specific subframe of a specific frame or only to the specific subframes of odd-numbered or even-numbered frames. Further, it may be possible to set repeated transmission by assigning each transmission resource according to the repetition methods described above.

Meanwhile, when setting for repeatedly transmitting the PBCH is completed, the base station may perform the set repeated transmission of the PBCH (S320). That is, the base station can repeatedly transmit the PBCH for an MTC terminal 310. The repeatedly transmitted PBCH information may be the same or may be partially different, but it is possible to acquire PBCH information when performing soft combining on the repeated PBCH.

The MTC terminal 310 receives the repeatedly transmitted PBCHs in accordance with the repetition setting described above and then decodes the PBCHs by combining the repeatedly transmitted PBCHs (S330). Accordingly, the MTC terminal performs decoding by soft-combining a plurality of PBCHs repeatedly transmitted, whereby it can acquire corresponding information.

Hereinafter, PRACH transmission/reception by an MTC terminal is described.

PRACH (Physical Random Access Channel)

Figure 4:
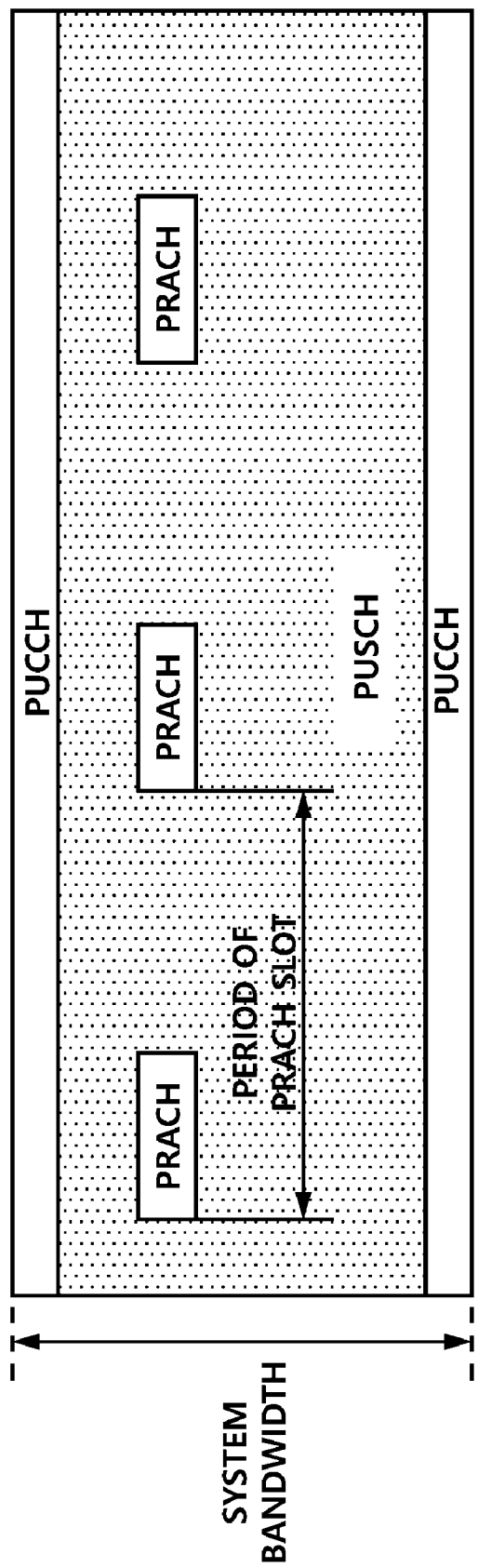
FIG. 4 is a diagram illustrating the structure of a PRACH.

FIG. 4 is a diagram illustrating the structure of a PRACH.

Referring to FIG. 4, a PRACH is a channel for transmitting a random access preamble transmitted from a terminal to a base station in a random access procedure. The PRACH is multiplied at time and frequency with a PUSCH and a PUCCH. A PRACH time-frequency resource is assigned in a PUSCH region and periodically repeated.

The PRACH preamble is composed of OFDM symbols and is configured by adding the end portion of a preamble sequence as a CP to the front portion of the preamble.

Meanwhile, assuming the timing advance is 0, the terminal matches the start point of the random access preamble with the start point of an uplink subframe. Considering a transmission delay, there is a need for GT (Guard Time), so the preamble length is smaller than the length of a PRACH slot.

Four kinds of PRACH preamble formats are determined for an FDD mode and the formats are determined in accordance with a sequence and the length of the CP.

The MTC terminal can also perform the random access procedure with a base station using the PRACH described above. However, as described above, the MTC terminal needs to expand the coverage, so it is required to repeatedly transmit the PRACH. Accordingly, when repeatedly transmitting the PRACH, it is required to use existing PRACH formats or define a new PRACH format.

The MTC terminals of the present invention and existing terminals may share the same time/frequency resources. In this case, the MTC terminals can be multiplied with the existing terminals using code division multiple (CDM). It is possible to multiply repetition level(s) in the time/frequency resources.

It may be possible to define specific additional time/frequency resource area (s) to the MTC terminals. At least CDM may be allowed in a new region.

Meanwhile, frequency hopping may be allowed when the PRACH is repeatedly transmitted.

Alternatively, specific repetition levels for repeated transmission may be defined and set for the MTC terminals.

That is, the MTC terminal can repeatedly transmit the PRACH by a predetermined number of times. If the MTC terminal repeatedly transmits the PRACH by a predetermined number of times, but cannot receive a random access response (RAR) for the PRACH, it is possible to change the repetition level and retransmit the PRACH. Alternatively, it may be possible to ramp up the transmission power and retransmit the PRACH. The transmission power may be increased step by step and may be increased in an analogue type. For example, when the MTC terminal increases the number of times of repetition in order of a first time, a second time, and a third time, but cannot receive a RAR, it is possible to improve the transmission power to a predetermined level and retransmit the PRACH. In this case, it may also be possible to sequentially increase the number of times of repetition in order of a first time, a second time, and a third time in accordance with the repetition level.

Alternatively, a repetition level determined in accordance with the number of times of repetition may be set and the PRACH may be transmitted with different numbers of times of repetition due with a change of the respective repetition level.

For example, a specific maximum number of levels of the PRACH may be 3. In other words, the repetition level of the PRACH, for example, may be one of 1, 2, and 3. The fact that the specified maximum number of levels of the PRACH is 3 does not include "zero coverage extension".

A number of repetitions per level may be a value that can be set. In this case, the set value of the first repetition transmission may be defined as 1 attempt (1 attempt=configured number of repetitions). The number of times of repetition at each level may be fixed or may be changed for each setting. In this case, the numbers of times of repetition levels and repetition transmission of the PRACH may make a functional relationship. When the repetition level is 1 and the PRACH is repeatedly transmitted by n times, the number of times of repetition transmission of the PRACH at a repetition level m may be m×n. For example, it is possible to repeatedly transmit the PRACH five times at the repetition level 1, 10 times at the repetition level 2, and fifteen times at the repetition level 3.

Further, power ramping may be supported when the PRACH is repeatedly transmitted.

When a terminal does not receive a RAR (random access response) after the 1 attempt (setting value for 1 repetition transmission), it is possible to move to the next level (for example, move the number of times of repetition transmission from 5 to 10 or from 10 to 15). It may depend on the base station how many attempts are allowed at the highest level. When a terminal does not receive a RAR (random access response) after the 1 attempt (setting value for 1 repetition transmission), it is possible to perform power ramping in advance, later, or simultaneously when moving to the next level (for example, move the number of times of repetition transmission from 5 to 10 or from 10 to 15).

As an embodiment, when repetition transmission of the PRACH and power ramping are simultaneously performed and a terminal does not perform a step of receiving an RAR from a base station after the step of repeatedly transmitting the PRACH preamble, it may be possible to perform a step of moving repetition transmission of the PRACH preamble to the next level and simultaneously performing power ramping.

On the other hand, a starting level for contention based random access procedure 1) may start with the lowest level or may be measured or determined on the basis of other ways, or 2) may be set by a base station (dedicated RRC signaling) in an RRC connected mode.

Consequently, the MTC terminal repeatedly transmits the PRACH in accordance with the predetermined number of times of repetition. Thereafter, when random access fails, it may be possible to repeatedly transmit the PRACH by the number of times of repetition defined at the next repetition level by changing the PRACH transmission level.

Alternatively, the MTC terminal may repeatedly transmit the PRACH by the number of times of repetition determined with the next transmission power by changing the transmission power to the next level when random access fails.

Alternatively, when random access fails, the MTC terminal may repeatedly transmit the PRACH while sequentially changing the repetition level to the set maximum level, and when transmission fails even at the maximum repetition level, it may possible to transmit it with the next transmission power. That is, when the repetition level is sequentially changed and repetition transmission fails even at the maximum repetition level, it is possible to perform repetition transmission by ramping up the transmission power. In this case, it is possible to perform repetition transmission by changing the repetition level back to the initial repetition level and it may be possible to transmit it at the existing repetition level.

PDCCH/PDSCH

The PDCCH means a channel for transmitting DCI (Downlink Control Information). The DCI includes resource assignment information or other control information of a terminal or a terminal group. In general, a plurality of PDCCHs may be transmitted with one subframe.

Each PDCCH is transmitted by one or a plurality of CCEs (Control Channel Element), in which one CCE is composed of nine REGs and four QPSK symbols are mapped in one REG. An RE assigned to a reference symbol is not included in the REG, so the number of REGs depends on whether there is a peculiar reference signal of a cell.

There are four PDCCH formats and the number of necessary CCEs is different for the formats.

The number of CCEs that are used for transmitting a specific PDCCH is determined by an eNodeB in accordance with channel conditions. For example, a terminal close to the eNodeB has a good characteristic of a downlink channel, so only one CCE is sufficient. However, when a terminal is on the boundary of a cell and has a poor channel characteristic, eight CCEs are required. Further, the power level of the PDCCH is also adjusted in accordance with the channel characteristic.

The contents of a control channel message included in the DCI are in connection with the operation type of the system. For example, when a system does not support MIMO or a terminal is set in a transmission mode not including MIMO, there is no need for transmitting parameters required only for MIMO transmission. The number of bits required for resource assignment depends on the bandwidth of the system, so the message size also depends on the bandwidth of the system.

A 16 bits CRC is added to the PDCCH and the terminal can detect whether there is an error in the PDCCH using the CRC. Further, the terminal needs to check whether the received PDCCH has been assigned to itself of a plurality of terminal, which may be achieved by adding an identifier to the payload of the PDCCH. In order to determine whether the PDCCH has been assigned to itself, there is a method of scrambling the CRC with the terminal identifier and this method has the advantage that it is not required to add an identifier to a payload.

An EPDCCH means a channel for transmitting control information transmitted through the PDCCH in a data region. Accordingly, the control channel transmitted in the data region may be called EPDCCH (Extended PDCCH or Enhanced PDCCH), but is not limited thereto.

As for an EPDCCH newly introduced for 3GPP LTE/LTE-A release 11 and the following system, transmission is performed through a PDSCH region unlike the legacy PDCCH and it is determined that EPDCCH sets composed of M PRB (Physical Resource Block) groups (a group of M PRBs) (m=2, 4 or 8) are assigned to a corresponding cell up to K (K=1 or 2) for a terminal set to receive DCI (Downlink Control Information) through a corresponding to EPDCCH. Further, EPDCCH sets that are set for a predetermined terminal may have different K values.

An EPDCCH set may be a localized type and a distributed type, depending on an EPDCCH transmission type, and M described above may be 1 or 2n (n=1, 2, 3, 4, 5) in the localized type, but is not limited thereto. Meanwhile, M may be 2, 4, 8, and 16 in the distributed type, but is not limited thereto.

Meanwhile, K ((K≥≥1) EPDCCH sets may be assigned for one terminal, in which the EPDCCH sets are the distributed type or the localized type, so KL localized type EPDCCHs and KD distributed type EPDCCHs may be assigned for one terminal. That is, KL+KD=K. For example, when K is 2, KL may be one of 0, 1, and 2 and KD may be one of 2, 1, and 0.

It may be possible to introduce EREG (Enhanced REG)/ECCE (Enhanced CCE) to the EPDCCH in response to the concept of the REG and CCE of a PDCCH of the related art, for EPDCCH transmission resource mapping for a predetermined terminal.

According to the newly introduced EREG/ECCE, a total of sixteen EREGs from EREG #0 to EREG #15 may be configured for one pair of PRBs constituting each EPDCCH set in the corresponding PRB pair regardless of whether there are not only a frame structure type, a subframe configuration, a CP (Cyclic Prefix), but a legacy PDCCH control region size, and other reference signals (for example, a CRS, a CSI-RS, and PRS etc.) expect for a DM-RS.

In detail, as for a normal CP for a pair of PRBs constituting a predetermined EPDCCH set, it is possible to perform EREG indexing from 0 to 15 on a frequency first and then time manner in sixteen numbers for 144 REs except for 24 REs for a DM-RS of 12×14, that is, a total of 164 REs. As for an expanded CP, similarly, it is possible to perform EREG indexing from 0 to 15 in a frequency first and then time manner on sixteen numbers for 128 REs except for 16 REs for a DM-RS of 12×12, that is, a total of 144 REs.

As for the MTC terminal of the present invention, it is possible to receive control information through the EPDCCH, so timings for a PDCCH and an EPDCCH that are channels for transmitting control information and a PDSCH indicated by the control information included in the corresponding channels will be described hereafter. A downlink control channel, a meaning that include both of the PDCCH and the EPDCCH, is referred to as an (E)PDCCH. Accordingly, an (E)PDCCH may mean the PDCCH or the EPDCCH.

The present invention proposes a plan about the relationship between a PDSCH timing and an (E)PDCCH timing in relation to when the PDSCH has been indicated when (E)PDCCHs are repeatedly received for an MTC terminal. The corresponding timing information should be provided to the MTC terminal, and may not be set by high layer parameters dedicated only for this purpose and may not be indicated by the (E)PDCCH.

In general, a previous PDSCH is transmitted after a PDCCH is transmitted, and the PDCCH includes scheduling information for the PDSCH and provides information for a terminal to receive data information using the PDSCH.

However, the (E)PDCCHs for the MTC terminal of the present invention repeatedly transmitted. Accordingly, the PDSCH may not be transmitted before the last (E)PDCCH is transmitted in the repetition transmission. That is, the PDSCH may be repeatedly transmitted after the (E)PDCCHs are repeatedly transmitted.

In this case, a base station needs to share information about a start subframe where the PDSCH is repeatedly transmitted, with the MTC terminal. This is because it is possible to perform accurate decoding when knowing the points of time when the repetition of the (E)PDCCHs is stopped and the PDSCH starts to be transmitted.

Accordingly, a PDSCH repetition start subframe of the present invention may be started from a subframe n+k (k>0, natural number), when the subframe n is the last subframe of repetition transmission of the (E)PDCCHs.

In this case, k may be fixed regardless of the number of times of repetition transmission of the (E)PDCCHs or may have a relationship with the number of times of repetition transmission of the (E)PDCCHs. For example, the larger the number of times of repetition transmission of the (E)PDCCHs, the large the k may be. The larger the number of times of repetition transmission of the (E)PDCCHs, the longer the time for decoding the (E)PDCCHs through soft combining or chase combining may be, so k may be increased.

Alternatively, in contrast, when the number of times of repetition transmission of the (E)PDCCHs is sufficiently high, decoding of an (E)PDCCH may be possible before the subframe n where the last (E)PDCCH is repeatedly transmitted, so the larger the number of times of repetition transmission of the (E)PDCCHs, the smaller the k may be.

For example, the base station includes a step of performing repetition transmission of the (E)PDCCHs and a step of starting PDSCH transmission at the subframe n+k (k>0, natural number) when the subframe n is the last subframe of the repetition transmission of the (E)PDCCHs. As described above, k may be fixed regardless of the number of times of repetition transmission of the (E)PDCCHs or may have a relationship with the number of times of repetition transmission of the (E)PDCCHs.

Figure 5:
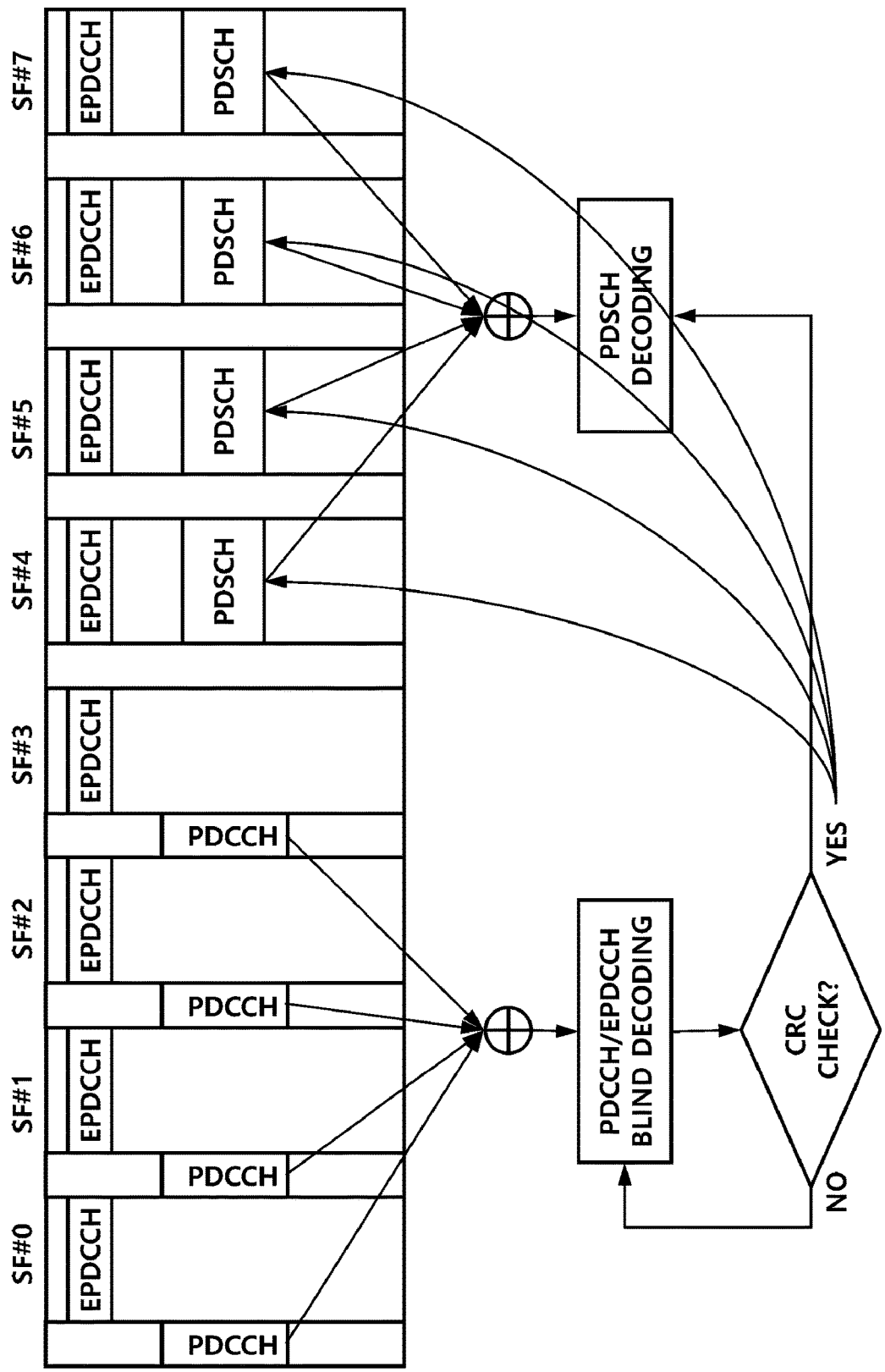
FIG. 5 is a view illustrating an example of a method in which an MTC terminal performs blind decoding on a PDCCH or an EPDCCH and receives a PDSCH.

FIG. 5 is a view illustrating an example of a method in which an MTC terminal performs blind decoding on a PDCCH or an EPDCCH and receives a PDSCH.

In the example illustrated in FIG. 5, a base station repeatedly transmits one DCI through four frames from SF #0 (Subframe Number #0) to SF #3 in consideration of the channel situation of an MTC terminal. Further, the base station repeatedly transmits the same data through four subframes from SF #3 to SF #6 in consideration of the channel situation of the MTC terminal. The MTC terminal performs blind decoding by soft-combining the received values of DCI transmitted through the SF #0 to SF #3, and when CDR check is succeeded, the MTC terminal checks scheduling information of a PDSCH included in the DCI. The MTC terminal performs decoding by soft-combining received values of the data transmitted through the SF #3 to SF #6.

As described above, when a PDCCH or an EPDCCH for the MTC terminal is transmitted and repetition is supplied for the corresponding channel, there is a need for the number of time of corresponding repetition and the definition of the start subframes for the PDCCH and the PDSCH including repetition in order that the corresponding MTC successively performs decoding.

An MTC terminal according to an embodiment of the present invention may be supported with an (E)PDCCH for scheduling a PDSCH into a terminal-specific search space. Further, repetition transmission of (E)PDCCHs having multiple levels may be supported. From the UE perspective, start subframes where (E)PDCCHs can be repeatedly transmitted may be limited to a subset of subframes. That is, subset of specific subframes is configured and repetition transmission of (E)PDCCHs may be started at one of the specific subframes.

There may be various methods of configuring a subset of specific subframes.

For example, it is possible to configure a fixed subset in accordance with the DCI format of an (E)PDCCH. That is, it is possible to configure a separate subset in accordance with the DCI format of downlink scheduling and the DCI format of uplink grant. In this case, it may be possible to configure the same subsets or different subsets in accordance with the DCI formats (DCI formats 1, 1a, 1b, 2, and 3) of the downlink scheduling. Similarly, it may be possible to configure the same subsets or different subsets in accordance with the DCI (DCI formats 0 and 4) of the uplink grant.

As another example, it may be possible to configure a subset in accordance with the number of times of repetition transmission (repetition transmission level) of (E)PDCCHs. That is, as the number of times of repetition transmission (repetition transmission level) of (E)PDCCHs is large, it is possible to decrease the number of subframes constituting a subset. In contrast, as the number of times of repetition transmission (repetition transmission level) of (E)PDCCHs is small, it is possible to increase the number of subframes constituting a subset. On the contrary to the above description, it is possible to increase the number of subframes constituting a subset in proportion to the number of times of repetition transmission of (E)PDCCHs.

Periodic repetition transmission of CSI is not supported for the PUCCH. Periodic repetition transmission of CSI may not be transmitted for the PUCCH. For the PUCCH, ACK/NACK is supported, but setting of ACK/NACK may be considered. Dedicated SR is supported, but a new format for repetition transmission of the PUCCH for the SR is not defined.

Repetition transmission of PDSCHs to multiple subframes may be supported. Multiple repetition transmission levels may be specified in a time domain.

Hereinafter, operation of a base station and a terminal of the present invention will be described in detail with reference to the drawings.

Figure 6:
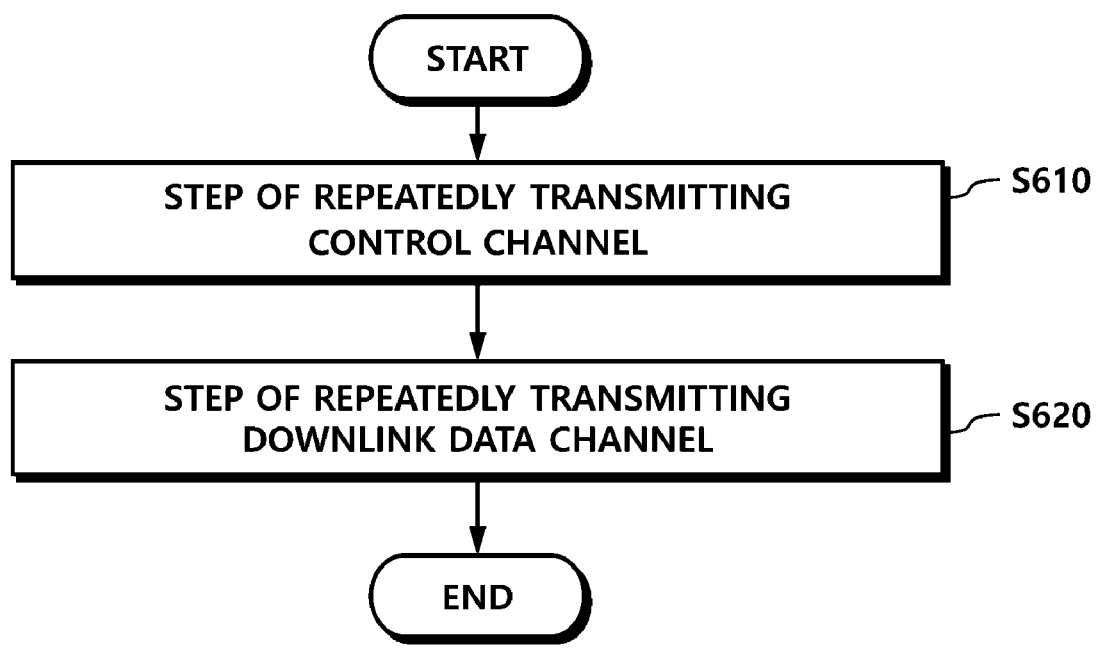
FIG. 6 is a diagram illustrating the operation of a base station according to an embodiment of the present invention.

FIG. 6 is a diagram illustrating the operation of a base station according to an embodiment of the present invention.

A base station according to an embodiment of the present invention provides method for a base station to transmit a control channel, the method including repeatedly transmitting a control channel including control information and a step of repeatedly transmitting a downlink data channel (PDSCH) on the basis of information about the subframe where the repeatedly transmitted control channel is ended.

Referring to FIG. 6, the base station can repeatedly transmit a control channel including control information to an MTC terminal (S610). The control information may include downlink scheduling information or uplink grant information. Further, the control channel including the control information includes the PDCCH or the EPDCCH described above. Accordingly, the control channel may mean a channel that is transmitted to a terminal, including control information, regardless of the transmission type.

Meanwhile, the base station may include a step of repeatedly transmitting a downlink data channel (PDSCH) on the basis of information about the subframe where the transmitted control channel is ended (S620).

The downlink control channel may be transmitted after the subframe where the repeatedly transmitted control channel is ended is ended. That is, when the subframe where the control channel is ended is n, the downlink control channel may be started and transmitted at the n+k-th (k>0, natural number) subframe. In other words, repetition transmission of the downlink control channel may be performed after predetermined subframes, after the subframe where the control channel is repeatedly transmitted is ended. In the present invention, the downlink data channel means a channel for transmitting data information, for example, it may mean the PDSCH.

Meanwhile, k may be a value set and fixed regardless of the number of times of repetition transmission of the control channel. That is, k may be a value fixed to a value that is set regardless of the base station and the MTC terminal. Alternatively, the base station may inform the MTC terminal of information about k through high layer signaling.

As another example, k may be a value that is determined in accordance with the number of times of repetition transmission of the control channel. That is, k may be dynamically determined in accordance with the number of times of repetition transmission or the repetition level of the control channel. For example, k may be increased when the number of times of repetition transmission of the control channel is increased. Alternatively, k may be decreased when the number of times of repetition transmission of the control channel is increased. That is, k may be increased or decreased in accordance with the number of times of repetition transmission of the control channel. k may be increased or decreased in response to the number of times of repetition transmission, or one k may be determined for a predetermined period of the number of times of repetition transmission.

As another embodiment, the control channel of the present invention may starts to be repeatedly transmitted at a specific subframe, in which the specific subframe may be composed of a subset of at least two subframes and may be determined as one of subframes included in the subset. That is, the subframe where the control channel starts to be repeatedly transmitted may be composed of a subset that is a group of at least two subframes and the subframe where the control channel starts to be repeatedly transmitted may be determined as one of subframes included in the subset.

That is, the aforementioned subset may be a separate subset in accordance with the DCI format of downlink scheduling and the DCI format of uplink grant, respectively.

Further, the number of the subframes constituting the subset may be determined on the basis of the number of times of repetition transmission of the control channel. For example, when the number of times of repetition transmission of the control channel is increased, the number of the subframes constituting the subset may be determined to be decreased. As another example, when the number of times of repetition transmission of the control channel is decreased, the number of the subframes constituting the subset may be determined to be increased.

Further, the base station may perform various repetition transmission methods described above with reference to FIGS. 1 to 5.

Figure 7:
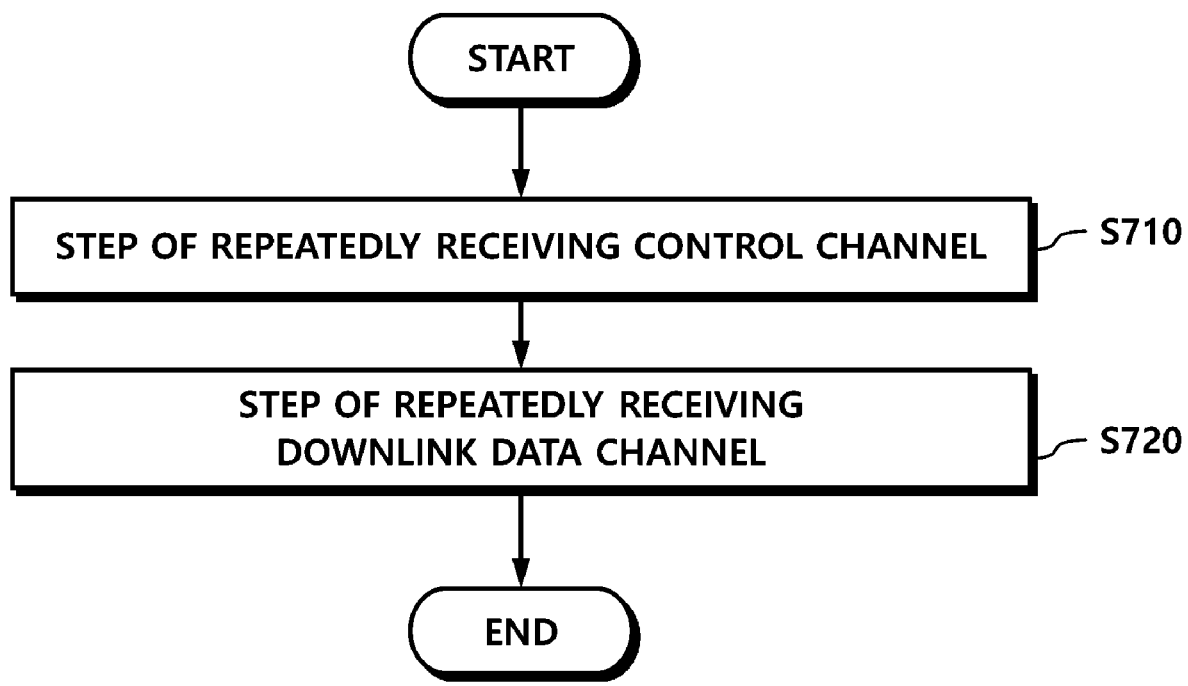
FIG. 7 is a diagram illustrating the operation of a terminal according to an embodiment of the present invention.

FIG. 7 is a diagram illustrating the operation of a terminal according to an embodiment of the present invention.

A base station according to an embodiment of the present invention provides method for a terminal to receive a control channel, the method including a step of repeatedly receiving a control channel including control information and a step of repeatedly receiving a downlink data channel (PDSCH) on the basis of information about a subframe where repetition transmission of the control channel is ended.

Referring to FIG. 7, the MTC terminal of the present invention may include a step of repeatedly receiving a control channel including control information (S710). The control information may include downlink scheduling information or uplink grant information. Further, the control channel including the control information includes the PDCCH or the EPDCCH described above. Accordingly, the control channel may mean a channel that is received to a terminal, including control information, regardless of the transmission type.

Further, the MTC terminal of the present invention may include a step of repeatedly receiving a downlink data channel (PDSCH) on the basis of information about the subframe where the repeatedly transmitted control channel is ended (S720).

The downlink control channel may be received after the subframe where the repeatedly transmitted control channel is ended is ended. That is, when the subframe where the control channel is ended is n, the downlink control channel may be started and received at the n+k-th (k>0, natural number) subframe. In other words, repetition reception of the downlink control channel may be performed after predetermined subframes, after the subframe where the control channel is repeatedly received is ended. In the present invention, the downlink data channel means a channel for transmitting data information, for example, it may mean the PDSCH.

Meanwhile, k may be a value set and fixed regardless of the number of times of repetition transmission of the control channel. That is, k may be a value fixed to a value that is set regardless of the base station and the MTC terminal. Alternatively, the base station may inform the MTC terminal of information about k through high layer signaling.

As another example, k may be a value that is determined in accordance with the number of times of repetition transmission of the control channel. That is, k may be dynamically determined in accordance with the number of times of repetition transmission or the repetition level of the control channel. For example, k may be increased when the number of times of repetition transmission of the control channel is increased. Alternatively, k may be decreased when the number of times of repetition transmission of the control channel is increased. That is, k may be increased or decreased in accordance with the number of times of repetition transmission of the control channel. k may be increased or decreased in response to the number of times of repetition transmission, or one k may be determined for a predetermined period of the number of times of repetition transmission.

As another embodiment, the control channel of the present invention may starts to be repeatedly transmitted at a specific subframe, in which the specific subframe may be composed of a subset of at least two subframes and may be determined as one of subframes included in the subset. That is, the subframe where the control channel starts to be repeatedly transmitted may be composed of a subset that is a group of at least two subframes and the subframe where the control channel starts to be repeatedly transmitted may be determined as one of subframes included in the subset.

That is, the aforementioned subset may be a separate subset according to the DCI format of downlink scheduling and the DCI format of uplink grant, respectively.

Further, the number of the subframes constituting the subset may be determined on the basis of the number of times of repetition transmission of the control channel. For example, when the number of times of repetition transmission of the control channel is increased, the number of the subframes constituting the subset may be determined to be decreased. As another example, when the number of times of repetition transmission of the control channel is decreased, the number of the subframes constituting the subset may be determined to be increased.

Further, the MTC terminal may perform various repetition reception methods described above with reference to FIGS. 1 to 5.

Figure 8:
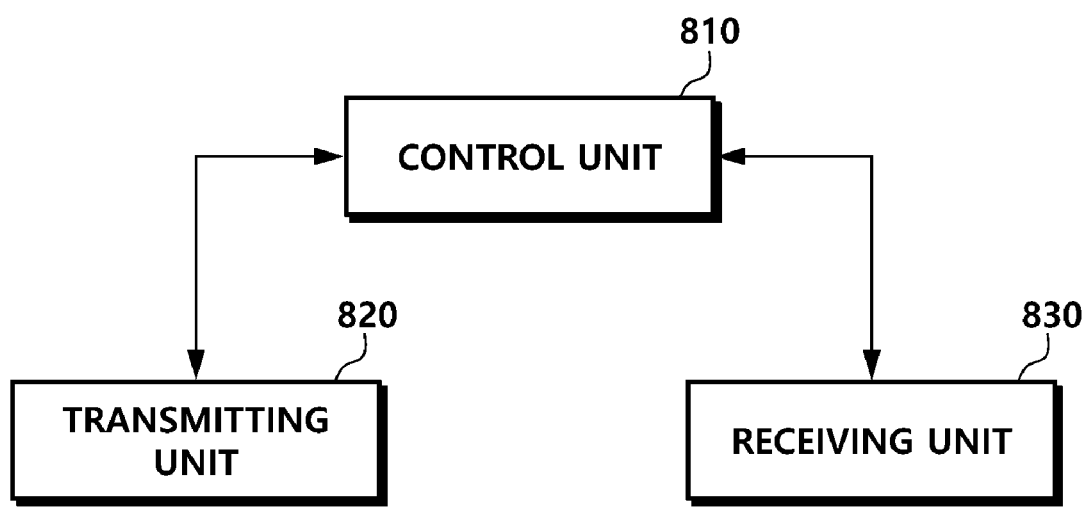
FIG. 8 is a diagram illustrating the configuration of a base station according to an embodiment of the present invention.

FIG. 8 is a diagram illustrating the configuration of a base station according to an embodiment of the present invention.

A base station 800 according to an embodiment of the present invention includes a control unit 810 that determines a specific subframe where repetition transmission of a control channel is started and a transmitting unit 820 that repeatedly transmits the control channel including control information from the specific subframe and repeatedly transmits a downlink data channel (PDSCH) on the basis of information about the subframe where the repeatedly transmitted control channel is ended, in which when the subframe is composed of a subset of at least two subframes, the control unit 810 can determine the specific subframe as one of the subframes included in the subset.

Referring to FIG. 8, the base station 800 according to an embodiment of the present invention includes a control unit 810, a transmitting unit 820, and a receiving unit 830.

The control unit 810 controls the overall operation of a base station for control channel repetition transmission and downlink data channel repetition transmission for performing the prevent invention. Further, the control unit 810 can determine a specific subframe where repetition transmission of a control channel is started. Further, when a specific subframe is composed of a subset of at least two subframes, the control unit 810 can determine one of the subframes included in the subset as the specific subframe.

The transmitting unit 820 repeatedly transmits a control channel including control information from the specific subframe and can repeatedly transmit a downlink data channel on the basis of information about the subframe where the repeatedly transmitted control channel is ended.

Further, the transmitting unit 820 and the receiving unit 830 are used to transmit and receive signals, message, and data for performing the present invention to and from a terminal. Further, the base station 800 includes configurations that can respectively perform the operations of the base station of FIGS. 1 to 6.

Figure 9:
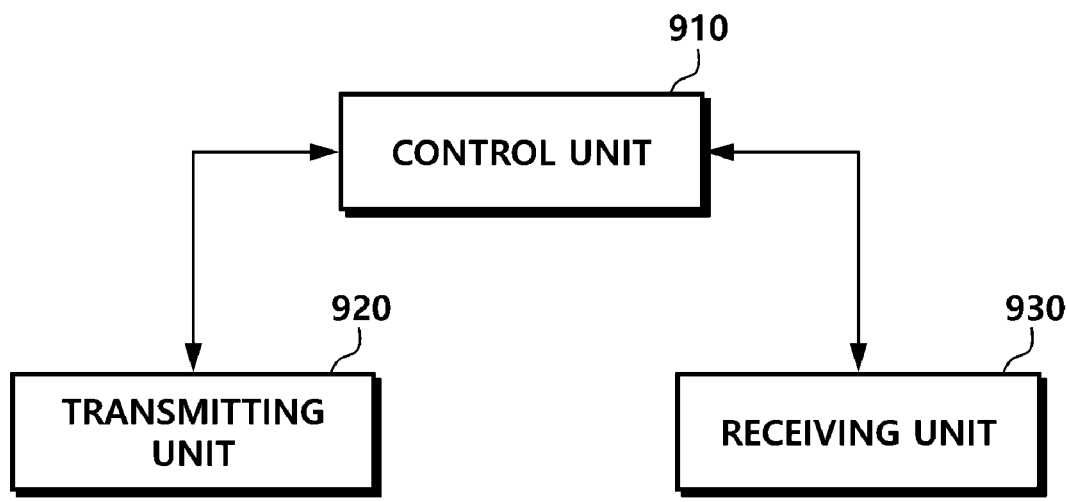
FIG. 9 is a diagram illustrating the configuration of user equipment according to an embodiment of the present invention.

FIG. 9 is a diagram illustrating the configuration of user equipment according to an embodiment of the present invention.

A terminal 900 according to an embodiment of the preset invention includes a receiving unit 930 that repeatedly receives a control channel including control information and a control unit 910 that acquires control information by decoding a control channel, in which the receiving unit 930 can repeatedly receive downlink data channel on the basis of information about the subframe where the repeatedly transmitted control channel is ended.

Referring to FIG. 9, user equipment 900 according to an embodiment of the present invention includes a receiving unit 930, a control unit 910, and a transmitting unit 920.

The receiving unit 930 receives downlink control information and data, and messages from a base station through corresponding channels. Further, the receiving unit 930 repeatedly receives a control channel including control information and can repeatedly receive a downlink data channel on the basis of information about the subframe where the repeatedly transmitted control channel is ended.

Further, the control unit 910 can control overall operation of a terminal related to repetition transmission of a control channel and a downlink data channel for performing the present invention.

The transmitting unit 920 transmits uplink control information and data, and messages to a base station through corresponding channels.

Further, the respective configurations of the terminal may perform all of operations of the terminal of the present invention described with reference to FIGS. 1 to 7.

The present invention described above provides an effect for an MTC terminal to efficiently communicate with a base station in a wider coverage by defining subframe rules for repeatedly transmitting physical channels for the MTC terminal.

Further, the present invention provides a method and an apparatus for efficiently transmitting and receiving a downlink signal by determining the relationship between transmission and reception through a PBCH, a PRACH, a PDSCH, a PDCCH, and an EPDCCH as a physical channel for an MTC terminal.

The above description is an example that explains the spirit of the present invention and may be changed and modified in various ways without departing from the basic features of the present invention by those skilled in the art. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

The invention claimed is:

1. A method of receiving a downlink channel by a user equipment in enhanced coverage, the method comprising:
    repeatedly receiving, by the user equipment from a base station, a physical downlink control channel including control information in first one or more subframes in a subframe set configured for the user equipment in enhanced converage, and
    repeatedly receiving, by the user equipment from the base station, a physical downlink shared channel in second one or more subframes in the subframes set configured for the user equipment in enhanced coverage,
    wherein the control information includes downlink scheduling information related to the physical downlink shared channel,
    wherein the physical downlink shared channel in the second one or more subframes is repeatedly received after a subframe n that is a last subframe in which the physical downlink control channel is transmitted, and
    wherein a starting subframe of the second one or more subframes is a k-th subframe in the subframe set configured for the user equipment in enhanced coverage after the subframe n, and the k is a predetermined value.

2. The method of claim 1, wherein the physical downlink control channel is transmitted in a data region of the first one or more subframes, and the physical downlink control channel uses localized transmission or distributed transmission.

3. The method of claim 1, wherein k has a value predetermined regardless of a repetition level of the downlink control channel.

4. The method of claim 1, further comprising:
    repeatedly transmitting, by the user equipment based on a first transmission power to the base station, a random access preamble in a physical random access channel, and
    based on the user equipment being failed to receive a random access response in response to the random access preamble, repeatedly retransmitting, by the user equipment based on a second transmission power greater than the first transmission power to the base station, the random access preamble.

5. The method of claim 1, further comprising:
    repeatedly transmitting, by the user equipment based on a first repetition level to the base station, a random access preamble in a physical random access channel; and
    based on the user equipment being failed to receive a random access response in response to the random access preamble, repeatedly retransmitting, by the user equipment based on a second repetition level different from the first repetition level to the base station, the random access preamble.

6. The method of claim 1, further comprising:
    repeatedly transmitting, by the user equipment based on a first transmission power and a first repetition level to the base station, a random access preamble in a physical random access channel; and
    based on the user equipment being failed to receive a random access response in response to the random access preamble, repeatedly retransmitting, by the user equipment based on a second transmission power greater than the first transmission power and a second repetition level different from the first repetition level to the base station, the random access preamble.

7. A base station for transmitting a downlink channel to a user equipment in enhanced coverage, the base station comprising:
    a transmitting unit for transmitting the downlink channel;
    a receiving unit for receiving an uplink channel; and
    a control unit for controlling the transmitting unit and the receiving unit,
    wherein the control unit is configured to:
        control the transmitting unit to repeatedly transmit, to repeatedly transmit, to the user equipment, a physical downlink control channel including control information in first one or more subframes in a subframe set configured for the user equipment in enhanced coverage; and
        control the transmitting unit to repeatedly transmit, to the user equipment, a physical downlink shared channel in second one or more subframes in the subframe set configured for the user equipment in enhanced coverage,
    wherein the physical downlink shared channel in the second one or more subframes is repeatedly transmitted after a subframe n that is a last subframe in which the physical downlink control channel is transmitted, and
    wherein a starting subframe of the second one or more subframes is a k-th subframe in the subframe set configured for the user equipment in enhanced coverage after the subframe n, and the k is a predetermined value.

8. The base station of claim 7, wherein the physical downlink control channel is transmitted in a data region of the first one or more subframes, and the physical downlink control channel uses localized transmission or distributed transmission.

9. The base station of claim 7, wherein k has a value predetermined regardless of a repetition level of the downlink control channel.

10. The base station of claim 7, wherein the control unit is further configured to:
    control the receiving unit to repeatedly receive, from the user equipment based on a first transmission power, a random access preamble in a physical random access channel; and
    based on the user equipment being failed to receive a random access response in response to the random access preamble, control the receiving unit to receive repeated retransmissions of the random access preamble, from the user equipment based on a second transmission power greater than the first transmission power.

11. The base station of claim 7, wherein the control unit is further configured to:
  control the receiving unit to repeatedly receive, from the user equipment based on a first repetition level, a random access preamble in a physical random access channel; and
  based on the user equipment being failed to receive a random access response in response to the random access preamble, control the receiving unit to receive repeated retransmissions of the random access preamble, from the user equipment based on a second repetition level different from the first repetition level.

12. The base station of claim 7, wherein the control unit is further configured to:
  control the receiving unit to repeatedly receive, from the user equipment based on a first transmission power and a first repetition level, a random access preamble in a physical random access channel; and
  based on the user equipment being failed to receive a random access response in response to the random access preamble, control the receiving unit to receive repeated retransmissions of the random access preamble, from the user equipment based on a second transmission power greater than the first transmission power and a second repetition level different from the first repetition level to the base station.

13. A user equipment for receiving a downlink channel in enhanced coverage, the user equipment comprising:
  a transmitting unit for transmitting an uplink channel;
  a receiving unit for receiving the downlink channel; and
  a control unit for controlling the transmitting unit and the receiving unit,
  wherein the control unit is configured to:
    control the receiving unit to repeatedly receive, from a base station, a physical downlink control channel including control information in first one or more subframes in a subframe set configured for the user equipment in enhanced coverage, and
    control the receiving unit to repeatedly receive, from the base station, a physical downlink shared channel in second one or more subframes in the subframe set configured for the user equipment in enhanced coverage,
  wherein the control information includes downlink scheduling information related to the physical downlink shared channel,
  wherein the physical downlink shared channel in the second one or more subframes is repeatedly received after a subframe n that is a last subframe in which the physical downlink control channel is transmitted, and
  wherein a starting subframe of the second one or more subframes is a k-th subframe in the subframe set configured for the user equipment in enhanced coverage after the subframe n, and the k is a predetermined value.

14. The user equipment of claim 13, wherein the physical downlink control channel is transmitted in a data region of the first one or more subframes, and the physical downlink control channel uses localized transmission or distributed transmission.

15. The user equipment of claim 13, wherein k has a value predetermined regardless of a repetition level of the downlink control channel.

16. The user equipment of claim 13, wherein the control unit is further configured to:
  control the transmitting unit to repeatedly transmit, based on a first transmission power to the base station, a random access preamble in a physical random access channel; and
  based on the user equipment being failed to receive a random access response in response to the random access preamble, control the transmitting unit to repeatedly transmit, based on a second transmission power greater than the first transmission power to the base station, the random access preamble.

17. The user equipment of claim 13, wherein the control unit is further configured to:
  control the transmitting unit to repeatedly transmit, based on a first repetition level to the base station, a random access preamble in a physical random access channel; and
  based on the user equipment being failed to receive a random access response in response to the random access preamble, control the transmitting unit to repeatedly transmit, based on a second repetition level different from the first repetition level to the base station, the random access preamble.

18. The user equipment of claim 13, wherein the control unit is further configured to:
  control the transmitting unit to repeatedly transmit, based on a first transmission power and a first repetition level to the base station, a random access preamble in a physical random access channel; and
  based on the user equipment being failed to receive a random access response in response to the random access preamble, control the transmitting unit to repeatedly transmit, based on a second transmission power greater than the first transmission power and a second repetition level different from the first repetition level to the base station, the random access preamble.

* * * * *

UNITED STATES PATENT AND TRADEMARK OFFICE
CERTIFICATE OF CORRECTION

PATENT NO. : 10,805,868 B2  
APPLICATION NO. : 16/013951  
DATED : October 13, 2020  
INVENTOR(S) : Sun Woo Kim Page 1 of 1

It is certified that error appears in the above-identified patent and that said Letters Patent is hereby corrected as shown below:

In the Claims

In Claim 1, Column 17, Line 28, delete "converage" and insert --coverage-- therefor;

In Claim 1, Column 17, Line 31, delete "subframes set" and insert --subframe set-- therefor;

In Claim 4, Column 17, Line 56, delete "channels," and insert --channels;-- therefor;

In Claim 7, Column 18, Lines 27-28, after "to repeatedly transmit", delete ", to repeatedly transmit,"; and In Claim 7, Column 18, Line 37, after "enhanced coverage,", insert --wherein the control information includes downlink scheduling information related to the physical downlink shared channel,--.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*